Figure 1:
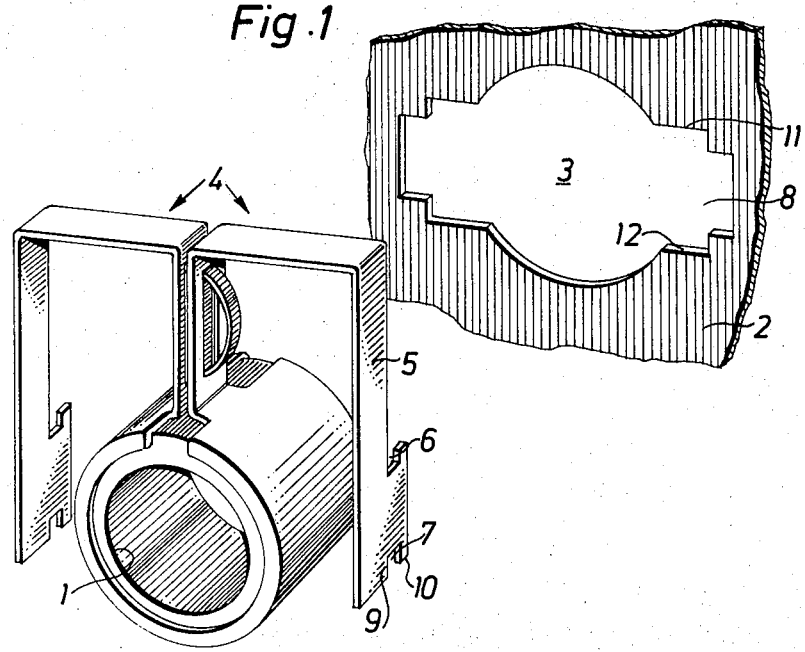

United States Patent [19]
Carlsson

[11] 3,808,661
[45] May 7, 1974

[54] DEVICE FOR FASTENING A BEARING IN A CONSTRUCTION MADE OF PLATE OR STRUCTURAL STEEL

[75] Inventor: Mats Carlsson, Helgevarma, Sweden

[73] Assignee: Aktiebolaget Svenska Flaktfabriken, Nacka, Sweden

[22] Filed: Feb. 16, 1973

[21] Appl. No.: 333,174

[30] Foreign Application Priority Data
Mar. 1, 1972 Sweden.......................... 2625/72

[52] U.S. Cl............................................. 29/200 P
[51] Int. Cl............................................. B23p 19/00
[58] Field of Search . 29/201, 200 P, 200 J, 149.5 R

[56] References Cited
UNITED STATES PATENTS
2,763,915  9/1956  Morgan.......................... 29/149.5 R
3,520,045  7/1970  Kuhn................................. 29/200 P Primary Examiner—Thomas H. Eager
Attorney, Agent, or Firm—Dorfman, Herrell &

[57] ABSTRACT

A cage for mounting a bearing in a plate, said cage having a cylindrical portion which snugly receives the bearing, preferably a plain bearing. The cylindrical portion of the cage is formed out of sheet material and has resilient mounting legs which are substantially planar and which are disposed parallel to the cylindrical axis and in outwardly spaced relation to the cylindrical portion. The legs have cut-out notches having a width corresponding to the thickness of the plate. The plate has a cut-out hole with a central circular portion for receiving the cylindrical portion of the cage and extensions which form T-slots adapted to receive and hold the notched legs. To permit periodic rotation of the cage within the hole for the purpose of equalizing wear, the legs and T-slots are preferably symmetrically arranged about the cylindrical axis, so that the legs may be flexed to disengage one T-slot and engage in another T-slot.

2 Claims, 2 Drawing Figures

PATENTED MAY 7 1974 3,808,661

DEVICE FOR FASTENING A BEARING IN A CONSTRUCTION MADE OF PLATE OR STRUCTURAL STEEL

The present invention concerns a device fo fastening a bearing, particularly a plain bearing, in a construction made of plate or structural steel and consisting of a bearing cage, which fits in a hole adapted for said bearing cage made of plate or structural steel and designed to be fastened in said hole without the employment of separate, detachable means of fastening.

The bearing cage comes in a large number of designs. Most of these are intended to operate at normal room temperatures. When bearing cages are to be mounted to an outer wall of an apparatus, they often contain an elastic material sucn as rubber or plastic. If the bearing cages are to be used at high temperatures, e.g. in a drying plant, the known design is as a rule expensive to manufacture or difficult to install. In the case of the known design, the cage must, therefore, be installed from one side of the mounting wall, and then the bearing is installed from the opposite side.

This invention concerns a bearing cage of an entirely new design, which apart from being inexpensive to make is also heat resistant and, therefore, can be used to advantage in dryer plants at relatively high temperatures. The bearing cage, according to the design indicated here, is primarily intended for a plain bearing which wears out mainly on its load side. The new design also results in an improvement in that the life of the bearing can be prolonged quite simply by turning the cage, with the bushing pressed in, 180°, i.e. half a turn.

The device, by virtue of the invention, is characterized primarily by that the bearing cage is made of material with generally the same qualities as the said plate or structural steel and is designed with at least two resilient ends or legs, which have parallel bearing axes and project from the central part of the bearing cage, the ends or legs being provided with indentions and by that the hole along its circumference is provided with the same number of ends or legs as there are recesses, the said indentions and recesses being so adapted to each other that when the bearing cage is inserted in the hole, the said ends or legs prevent the bearing cage from rotating in the hole and secure the bearing cage against axial play in relation to the plate as a result of the edges of these indentions enclosing both sides of the plate, and furthermore, in order to make possible the insertion and removal of the bearing cage into and out of the plate, the ends or legs can be elastically bent from their final, free form in order to fit profile cuttings in the recesses of the plate made for this purpose.

The submitted design of the device is characterized by that an even number of ends or legs and recesses are symmetrically arranged with symmetry axes running through the centre of the hole, whereupon after moderate wearing down of the bearing, the bearing cage can be removed and reinserted after rotating it half a turn in order to increase the life of the bearing.

Figure 2:
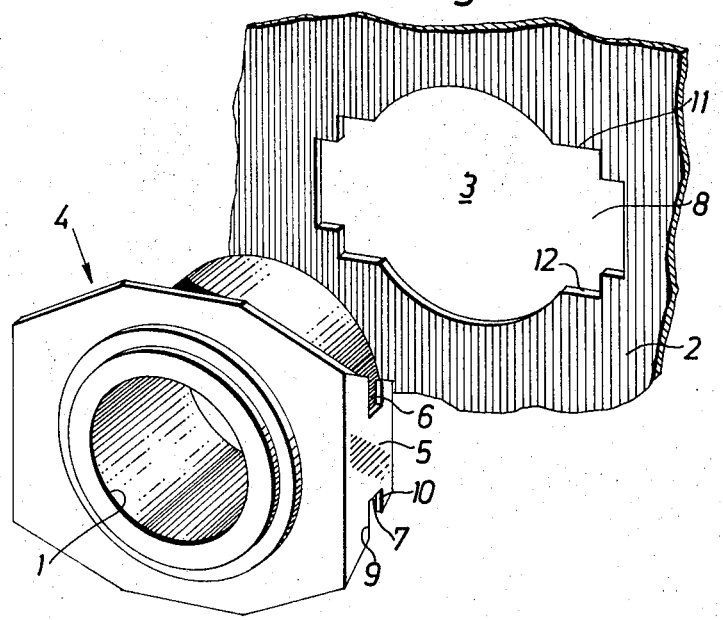

The invention will now be described in more detail in conjunction with the attached drawing, where FIG. 1 and FIG. 2 show in perspective two modified designs of the device.

In the drawing, 1 denotes a bearing, in particular a plain bearing. 2 shows a wall construction made of plate. 4 constitutes a comprehensive designation for a bearing cage. 3 designates a specially designed hole in plate 2 for insertion and holding of said bearing cage, and moreover, this design of hole 3 enables the bearing cage to be disassembled whenever appropriate. 5 denotes two resilient ends or legs, which project from the central part of the bearing cage. These are provided with indentions 6 and 7, especially designed to correspond to the thickness of wall 2. Hole 3 is shaped with recesses 8 which fit legs 5. Indentions 6 and 7 and the last-mentioned recesses should be so adapted to one another that — when the bearing cage is inserted into its hole 3 — these ends or legs 5 prevent the rotation of bearing cage 4 in said hole 3, and due to the fact that the edges of the indentions designated as 9 and 10 enclose both sides of the wall construction, i.e., plate 2, bearing cage 4 is ensured against axial play in relation to said plate 2. 11 and 12 designate profile cuttings in recesses 8 of plate 2. The ends of legs 5 can be elastically bent from their final free form in order to fit profile cuttings 11 and 12. In the drawing the design indicates that the device has an even number of ends or legs and matching recesses 8 symmetrically arranged with symmetry axes running through the centre of hole 3. This design has the advantage that bearing cage 4 — after ascertaining the wearing down of the bearing — can be removed with facility and after rotating it half a turn, i.e., 180°, in order to increase the span of life of the bearing, it is reinserted in its place with edges 9 and 10 of indentions 6 and 7 in their new position enclosing both sides of plate 2.

I claim:

1. Device for securing a bearing (1), in particular a plain bearing, in a construction made of plate (2) or structural steel and consisting of a bearing cage (4), which is fitted into a hole (3) occupied by said bearing cage of plate or structural steel and designed to be fastened in said hole without the use of a separate, detachable means of fastening, is characterized by that the bearing cage (4) is made of a material with generally the same qualities as said plate or structural steel and is formed with at least two resilient ends or legs (5), which have parallel bearing axes and project from the central part of the bearing cage (4), provided with indentions (6 and 7), and by that the hole (3) along its circumference is provided with the same number of ends or legs as there are recesses (8), the said indentions (6 and 7) and recesses (8) being so adapted to each other that when the bearing cage (4) is inserted in the hole (3), the said ends or legs (5) prevent the bearing cage (4) from rotating in the hole (3), as well as secure the bearing cage (4) against axial play in relation to the plate (2) as a result of the edges (9 and 10) of these indentions (6 and 7) enclosing both sides of the plate (2), and furthermore, in order to make possible the insertion and removal of the bearing cage (4) into and out of the plate (2), the ends or legs (5) can be elastically bent from their final, free form in order to fit profile cuttings (11 and 12) in the recesses (8) of the plate (2) made for this purpose.

2. Device, according to claim 1, is characterized by that an even number of ends or legs (5) and recesses (8) are symmetrically arranged with symmetry axes running through the centre of the hole (3) whereupon after moderate wearing down of the bearing, the bearing cage (4) can be removed and reinserted after rotating it half a turn in order to increase the life of the bearing.

* * * * *